(12) United States Patent
MacDonell (10) Patent No.: US 6,775,823 B2
(45) Date of Patent: Aug. 10, 2004

(54) METHOD AND SYSTEM FOR ON-LINE SUBMISSION AND DEBUG OF SOFTWARE CODE FOR A PORTABLE COMPUTER SYSTEM OR ELECTRONIC DEVICE

(75) Inventor: Kevin MacDonell, San Jose, CA (US)

(73) Assignee: PalmSource, Inc., Sunnyvale, CA (US)

( * ) Notice: Subject to any disclaimer, the term of this patent is extended or adjusted under 35 U.S.C. 154(b) by 427 days.

(21) Appl. No.: 09/727,987

(22) Filed: Mar. 7, 2001

(65) Prior Publication Data

US 2002/0129338 A1 Sep. 12, 2002

(51) Int. Cl.⁷ ................................................ G06F 9/44
(52) U.S. Cl. ......................................... 717/124; 716/4
(58) Field of Search ............................... 717/124, 138, 717/109; 709/1, 311, 102, 329; 716/18, 4; 703/20, 21, 23

(56) References Cited

U.S. PATENT DOCUMENTS

| | | | | |
|---|---|---|---|---|
| 5,613,098 A | * | 3/1997 | Landau et al. | 703/20 |
| 5,748,875 A | * | 5/1998 | Tzori | 714/29 |
| 5,832,205 A | * | 11/1998 | Kelly et al. | 714/53 |
| 5,857,106 A | * | 1/1999 | Barbour et al. | 717/138 |
| 5,887,169 A | * | 3/1999 | Lacombe | 709/311 |
| 5,918,035 A | * | 6/1999 | Van Praet et al. | 703/22 |
| 5,995,736 A | * | 11/1999 | Aleksic et al. | 716/18 |
| 6,006,022 A | * | 12/1999 | Rhim et al. | 716/1 |
| 6,028,996 A | * | 2/2000 | Sniderman et al. | 703/28 |
| 6,031,992 A | * | 2/2000 | Cmelik et al. | 717/138 |
| 6,052,524 A | * | 4/2000 | Pauna | 703/22 |
| 6,189,141 B1 | * | 2/2001 | Benitez et al. | 717/153 |
| 6,216,216 B1 | * | 4/2001 | Bonola | 712/28 |
| 6,269,409 B1 | * | 7/2001 | Solomon | 709/329 |
| 6,275,893 B1 | * | 8/2001 | Bonola | 710/262 |
| 6,463,583 B1 | * | 10/2002 | Hammond | 717/162 |
| 6,467,009 B1 | * | 10/2002 | Winegarden et al. | 710/305 |
| 6,496,847 B1 | * | 12/2002 | Bugnion et al. | 709/1 |
| 6,499,137 B1 | * | 12/2002 | Hunt | 717/164 |
| 6,615,167 B1 | * | 9/2003 | Devins et al. | 703/28 |

OTHER PUBLICATIONS

"Distributed Operating Systems", Andrew S. Tanenbaum et al, pp. 419–470, ACM Computing Surveys. vol. 17, No. 4, Dec. 1995.*

* cited by examiner

*Primary Examiner*—Todd Ingberg
(74) *Attorney, Agent, or Firm*—Wagner, Murabito & Hao LLP (57) ABSTRACT

One embodiment of the invention enables a computer user (e.g., software developer, software consumer, etc.) to remotely determine whether a software application (e.g., a video game) is compatible with a version of an operating system of an electronic device (e.g., a portable computer system). Specifically, the computer user transmits the program code of the software application to a simulator via the Internet (or any other type of communication medium). The simulator simulates the operation of the received software application code on an operating system in order to rate the performance of the code and/or detect any errors (e.g., incompatibilities) contained within the code. The simulator may also test the software application code against different versions and/or types of operating systems. Once the simulation is complete, the simulation software automatically generates a report corresponding to the performance of the software application with each tested version and/or type of operating system.

26 Claims, 6 Drawing Sheets

METHOD AND SYSTEM FOR ON-LINE SUBMISSION AND DEBUG OF SOFTWARE CODE FOR A PORTABLE COMPUTER SYSTEM OR ELECTRONIC DEVICE

TECHNICAL FIELD

The present invention generally relates to the field of portable electronic devices. More particularly, the present invention relates to the field of software applications that operate on personal digital assistants (PDAs) and other similar types of portable computing devices.

BACKGROUND ART

Computers and other electronic devices have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of a computer system or other type of electronic device is dramatically enhanced by coupling these type of stand-alone devices together in order to form a networking environment. Within a networking environment, users may readily exchange files, share information stored on a common database, pool resources, and communicate via electronic mail (e-mail) and via video teleconferencing. Furthermore, computers along with other types of electronic devices which are coupled to the internet provide their users access to data and information from all over the world. Computer systems have become useful in many aspects of everyday life both for personal and business uses.

Included within this broad category of computers and electronic devices is the personal digital assistant (commonly referred to as a PDA). Specifically, as the components required to build a computer system have been greatly reduced in size, new categories of computer systems have emerged. One of these new categories of computer systems is the personal digital assistant. A personal digital assistant is a portable computer system which is small enough to be held in the hand of its user and can be "palm-sized."

The personal digital assistant is usually a battery powered device that is typically used as an electronic organizer having the capability to store and display a wide range of information which can include numerous addresses and telephone numbers of business and personal acquaintances, financial information, daily appointments, along with various other personal information. In this manner, the personal digital assistant is able to consolidate a variety of information which is easily accessible by its user. Therefore, personal digital assistants are very useful and powerful devices.

It should be appreciated that personal digital assistants have become increasingly popular. As such, larger numbers of software applications have become available for personal digital assistants. Specifically, software applications for personal digital assistants are commercially available and can also be downloaded free from different web sites on the Internet. Moreover, these software applications include a wide variety of games, applications that "improve" the functionality of a personal digital assistant, electronic books and other resource materials, real-time regional traffic information, and the like.

Additionally, it is appreciated that as personal digital assistants have become more popular, there is a huge number of software developers (over 70,000) creating software applications that operate on personal digital assistants. As such, the software applications that personal digital assistants operate have continuously improved. There have also been new and updated versions of the software operating systems of personal digital assistants enabling the operating systems to operate better and also provide more functionality to personal digital assistants.

It should be understood that there are some disadvantages associated with the development of new and improved operating system versions for personal digital assistants. One of the disadvantages is that when a version of an operating system is changed, existing software applications may not be compatible with the new version of the operating system. As such, an existing software application may not even operate in conjunction with the new version of the operating system. In order to remedy this situation, software developers may upgrade or develop new software applications which are able to operate in conjunction with the new version of the operating system.

However, there are disadvantages associated with software developers trying to upgrade or develop new software applications that are compatible with the new version of the operating system. One of the disadvantages is that some software developers for personal digital assistants do not have the resources to properly determine whether their new or updated software code is compatible with the new version of the operating system. It would be advantageous to provide a mechanism available for developers to determine if their new software versions are compatible with the available operating system versions.

DISCLOSURE OF THE INVENTION

Accordingly, what is needed is a method and system which enables software developers for personal digital assistants to conveniently determine whether their software code is compatible with specified versions of an operating system. The present invention provides this advantage and others which will no doubt become obvious to those of ordinary skill in the art after having read the following detailed description of embodiments in accordance with the present invention.

Specifically, one embodiment of the present invention enables a computer user (e.g., software developer, software consumer, etc.) to remotely determine whether a software application (e.g., a video game) is compatible with a version of an operating system of an electronic device (e.g., a portable computer system). Specifically, the computer user transmits the program code of the software application to a simulator via the Internet (or any other type of communication medium). The simulator simulates the operation of the received software application code on an operating system in order to rate the performance of the code and/or detect any errors (e.g., incompatibilities) contained within the code. It is appreciated that the simulator may also test the software application code against different versions and/or types of operating systems. Once the simulation is complete, the simulation software automatically generates a report corresponding to the performance of the software application with each tested version and/or type of operating system. The report is then transmitted by the server computer to the computer of the user that submitted the software application code. In this manner, the computer user is apprised remotely as to the performance (and/or compatibility) of the software application with particular versions and/or types of operating systems of an electronic device.

In one embodiment, the present invention includes a method for remotely determining whether software application code is compatible with an operating system version of a computing device. The method includes the step of receiving software application code from a remote device via a communication medium. Additionally, the method includes the step of determining if the software application code is compatible with a version of an operating system of a computing device. In response to finding an incompatibility within the software application code, the method includes the step of logging the incompatibility. Moreover, the method includes the step of generating a report corresponding to the software application code. The method also includes the step of transmitting the report to the remote device via the communication medium.

In yet another embodiment, the present invention includes a computer readable medium having computer readable code embodied therein for causing a computer to perform steps similar to those describe in the previous paragraphs.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "receiving" or "generating" or "utilizing" or "determining" or "outputting" or "transmitting" or "communicating" or "encrypting" or "decrypting" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Exemplary Computer System

Figure 1:
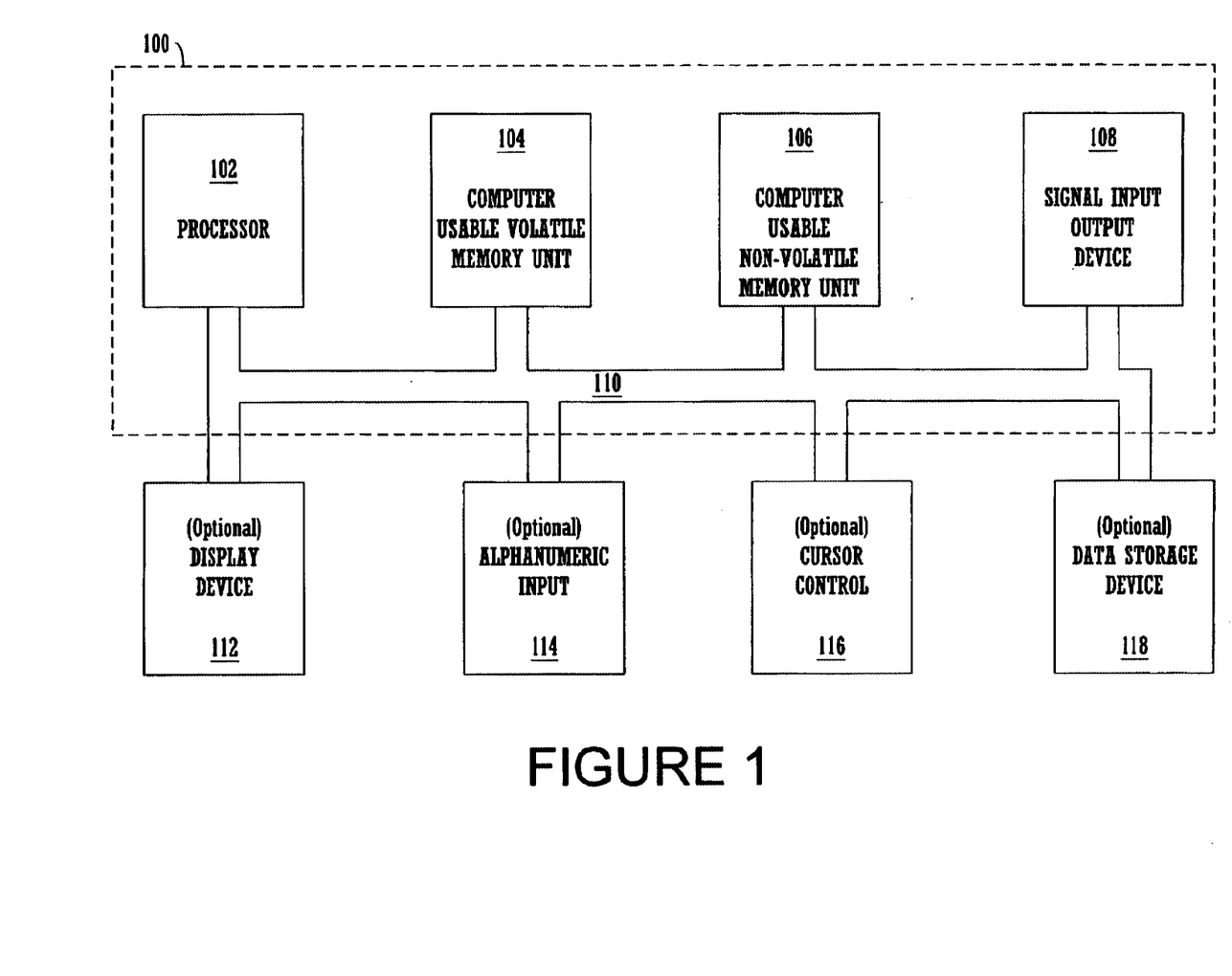
FIG. 1 is a block diagram of one embodiment of an exemplary computer system used in accordance with the present invention.

FIG. 1 is a block diagram of one embodiment of an exemplary computer system 100 used in accordance with the present invention. It should be appreciated that system 100 is not strictly limited to be a computer system. As such, system 100 of the present embodiment is well suited to be other types of electronic devices (e.g., remote server computer, personal digital assistant, mobile phone, portable laptop computer, pager, portable computing device, etc.). Within the following discussions of the present invention, certain processes and steps are discussed that are realized, in one embodiment, as a series of instructions (e.g., software program) that reside within computer readable memory units of computer system 100 and executed by processor(s) of system 100. When executed, the instructions cause system 100 to perform specific actions and exhibit specific behavior which is described in detail below.

In general, computer system 100 of FIG. 1 used by an embodiment of the present invention comprises an address/data bus 110 for communicating information, one or more central processors 102 coupled with bus 110 for processing information and instructions. Central processor unit 102 may be a microprocessor or any other type of processor. The computer system 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. System 100 also includes a signal generating and receiving device 108 coupled with bus 110 for enabling system 100 to interface with other electronic devices.

Optionally, computer system 100 can include a display device 112 which is coupled to bus 110 for displaying graphics and/or video. It should be appreciated that optional display device 112 may be a cathode ray tube (CRT), flat panel liquid crystal display (LCD), field emission display (FED), or other display device suitable for displaying video and/or graphic images and alphanumeric characters recognizable to a user. Furthermore, the system 100 can include an optional alphanumeric input device 114 including alphanumeric and function keys coupled to the bus 110 for communicating information and command selections to the central processor(s) 102.

Additionally, the computing device 100 of FIG. 1 can include an optional cursor control or cursor directing device 116 coupled to the bus 110 for communicating user input information and command selections to the central processor (s) 102. The cursor directing device 116 can be implemented using a number of well known devices such as a mouse, a track-ball, a track pad, an optical tracking device, a touch screen, etc. Alternatively, it is appreciated that a cursor can be directed and/or activated via input from alphanumeric input device 114 using special keys and key sequence commands. The present invention is also well suited to directing a cursor by other means such as, for example, voice commands. In addition, the cursor directing device 116 can also be a remote control device (e.g., a universal remote control device having a number of buttons, dials, etc.) with an infra-red signal communication capability. System 100 can also include a computer usable mass data storage device 118 such as a magnetic or optical disk and disk drive (e.g., hard drive or floppy diskette) coupled with bus 110 for storing information and instructions.

Figure 2:
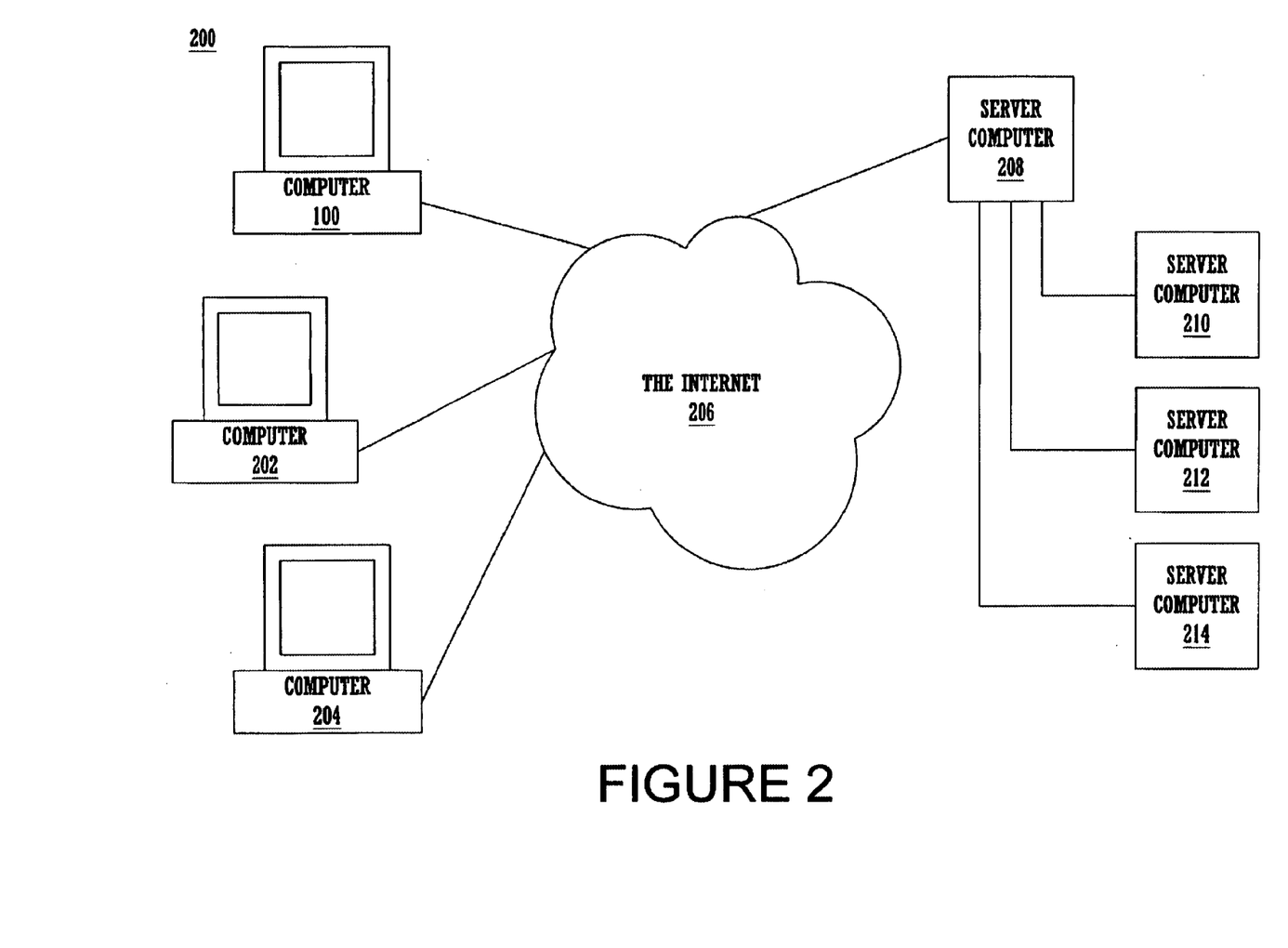
FIG. 2 is a block diagram illustrating one embodiment of a system for providing on-line submission and debug of software code in accordance with the present invention.

On-Line Submission and Debug of Software Code in Accordance With the Present Invention FIG. 2 is a block diagram illustrating a system 200 for providing on-line submission and debug of software code in accordance with an embodiment of the present invention. The present embodiment enables a person (e.g., software developer, software consumer, etc.) to remotely determine whether a software application (e.g., a video game) is compatible with an operating system of an electronic device (e.g., computing device, portable hand-held computing device, etc.). Specifically, the program code of the software application may be transmitted by a computer system (e.g., 100) to a simulator running on a server computer (e.g., 208) via the Internet 206 (or any other type of communication medium). The simulator of the server computer (e.g., 208) simulates the operation of the received software application code on a version of an operating system in order to rate the performance of the code and/or detect any errors (e.g., incompatibilities) contained within the code. It is appreciated that the simulator may also test the software application code against different versions and/or types of operating systems.

Once the simulation is complete, the simulation software generates a report or ratings corresponding to the performance of the software application code with each tested version and/or type of operating system. The report or ratings is then transmitted by the server computer (e.g., 208) to a receiving computer system (e.g., 100) where it can be read by the person that submitted the software application code. In this manner, the computer person (e.g., software consumer, software developer, etc.) is apprised remotely as to the compatibility (and/or performance) of the software application with particular versions and/or types of operating systems of an electronic device.

System 200 includes computer systems 100, 202, and 204 which are each communicatively coupled to the Internet 206. Furthermore, system 200 includes server computers 208, 210, 212 and 214 which are also communicatively coupled to the Internet 206. As such, server computers 208–214 and computer systems 100, 202, and 204 are able to communicate via the Internet 206. It should be appreciated that server computers 208–214 and computer systems 100, 202, and 204 of the present embodiment are well suited to be coupled to the Internet 206 in wide variety of implementations. For example, these devices of system 200 may be coupled to the Internet 206 via coaxial cable, copper wire, fiber optics, wireless communication, and the like. Moreover, it is understood that server computers 208–14 and computer systems 100, 202, and 204 may be communicatively coupled together without utilizing the Internet 206. That is, these devices of system 200 may be coupled together via coaxial cable, copper wire, fiber optics, wireless communication, and the like. Additionally, it is appreciated that server computers 208–214 and computer systems 100, 202, and 204 may be implemented in a variety ways in accordance with the present embodiment. For example, all of the devices of system 200 may each be implemented in a manner similar to computer system 100 of FIG. 1. However, the devices of system 200 are not strictly limited to such an implementation.

Figure 3:
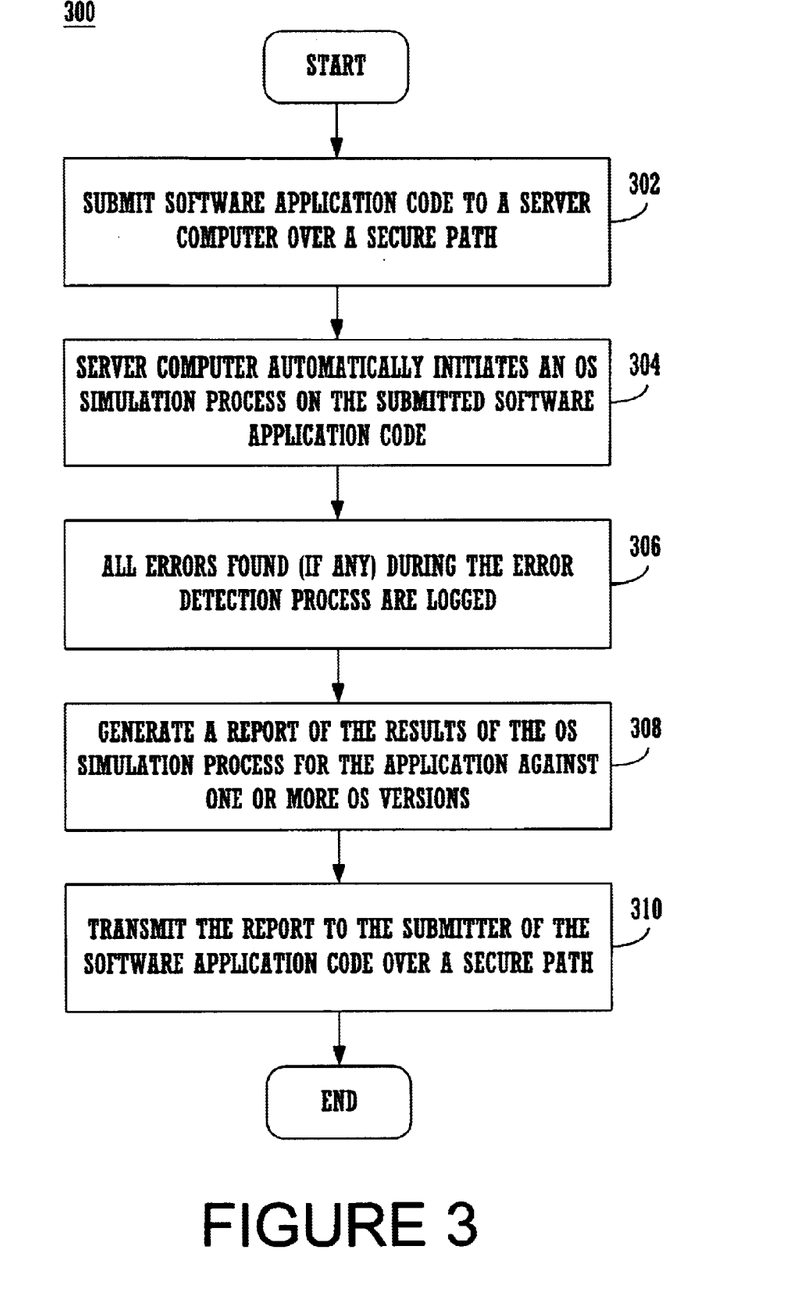
FIG. 3 is a flowchart of steps performed in accordance with one embodiment of the present invention for on-line submission and debug of software code.

FIG. 3 illustrates a flowchart 300 of steps performed in accordance with one embodiment of the present invention for on-line submission and debug of software code. Flowchart 300 includes processes of the present invention which, in one embodiment, are carried out by a processor and electrical components under the control of computer readable and computer executable instructions. Some or all of the computer readable and computer executable instructions may reside, for example, in data storage features such as computer usable volatile memory unit 104 and/or computer usable non-volatile memory unit 106 of FIG. 1. However, the computer readable and computer executable instructions may reside in any type of computer readable medium. Although specific steps are disclosed in flowchart 300, such steps are exemplary. That is, the present invention is well suited to performing various other steps or variations of the steps recited in FIG. 3. Within the present embodiment, it should be appreciated that the steps of flowchart 300 can be performed by software or hardware or any combination of software and hardware.

At step 302, in the present embodiment, computer 100 (FIG. 2) transmits the program code of a software application to server computer 208 over a secure communication path via the Internet 206 (or any other type of communication medium). It is appreciated that any computer (e.g., 202 and 204) of system 200 is able to perform step 302 in accordance with the present embodiment. Furthermore, the secure path of the present embodiment is well suited to be established in a variety of ways. For example, the secure path may be established by computer 100 and server computer 208 utilizing any type of encryption technique. It is understood that a person (e.g., software developer, software consumer, etc.) can initiate computer 100 to perform step 302.

In step 304 of FIG. 3, upon receiving the code of the software application, server computer 208 automatically acknowledges receipt of the code to computer 100 via the secure communication path and then automatically initiates a simulation process for the received software application code. Within another embodiment of step 304, server computer 208 automatically acknowledges receipt of the code to computer 100 via the secure path and then transmits the software application code to another server computer (e.g., 210–214) which automatically initiates a simulation process. In this manner, server computer 208 can direct the received software application code to an "idle" server computer that is not currently performing a simulation process.

Within the present embodiment of step 304, the simulation process simulates the operation of the received software application code on one or more versions of an operating system (OS) of an electronic device (e.g., portable computing device) in order to rate the performance (e.g., degree of compatibility) of the code and/or detect any errors (e.g., incompatibilities) contained within the code. It is appreciated that the simulation process of the present embodiment is well suited to also simulate the operation of the received software application code on different types of operating systems in order to rate the performance (e.g., degree of compatibility) of the code and/or detect any errors (e.g., incompatibilities) contained within the code. Additionally, it is understood that the present embodiment is well suited to utilize a wide variety of different types of simulation processes and/or error detection processes on the submitted software application code.

For example, one type of simulation process may simulate any particular number (e.g., million) of user interactions and/or operating system interactions with the software application code in order to determine if the code includes any errors. Additionally, this type of simulation process may also keep track of the amount of simulated interactions that occurred before an error was detected within the software application code. Another type of simulation process may determine if a set of predefined programming rules were followed by the submitted software application code. For instance, the simulation process may determine if the software application code accessed or used certain data structures, data spaces, and/or parts of memory that are not reserved for application programs.

At step 306 of FIG. 3, within the present embodiment, if any errors (e.g., incompatibilities) are found during the simulation process described above, they are automatically logged and/or recorded within a memory device. Therefore, if the software application code is tested against different versions and/or types of operating systems, the present embodiment is able to keep track of the code errors that occurred with each version and/or type of operating system. It is appreciated that the present embodiment is well suited to log and/or record a wide variety of information associated with the errors that are detected within the submitted software application code. For example, at step 306, the present embodiment may log the line number and/or the section of the software application code that contains the error(s). Additionally, the present embodiment may also log the reason(s) why that line and/or section of software application code failed. It is understood that the present embodiment is not limited to the information that it may log corresponding to the detection of any errors within the software application code.

In another embodiment of step 306, during the simulation process described above, any determined rating results (e.g., performance information) associated with the software application code are automatically logged and/or recorded in a memory device. Therefore, if the software application code is tested against different versions and/or types of operating systems, this embodiment is able to keep track of the determined rating results of the code corresponding to each version and/or type of operating system. It is understood that this embodiment is well suited to log and/or record a wide variety of information associated with the determined rating results of the submitted software application code.

In step 308, once the simulation process is complete, the present embodiment automatically generates a report or ratings corresponding to the results of the simulation process. That is, the present embodiment automatically generates a report or ratings corresponding to the performance of the submitted software application code with respect to each tested version and/or type of operating system. It is understood that the simulation report or ratings generated at step 308 may include some or all of the information logged at step 306 corresponding to the performance of the software application code and/or the detection of any errors within the software application code. It should also be appreciated that the simulation report generated at step 308 may include a ratings system rating how well the software application code performed with each tested version and/or type of operating system. It is understood that the performance ratings (e.g., degree of compatibility) that can be included in the simulation report enables a software consumer to know how well a particular software application will operate with each tested version and/or type of operating system.

At step 310 of FIG. 3, the simulation report is transmitted by server computer 208 to computer system 100 over a secure communication path via the Internet 206 (or any other type of communication medium). In this fashion, a user (e.g., software consumer, software developer, etc.) of computer 100 is informed remotely as to the performance (and/or compatibility) of the software application with particular versions and/or types of operating systems of an electronic device.

In other embodiments of flowchart 300, it is understood that manual initiations may be substituted for any or all of the automatic initiations described above.

Figure 4:
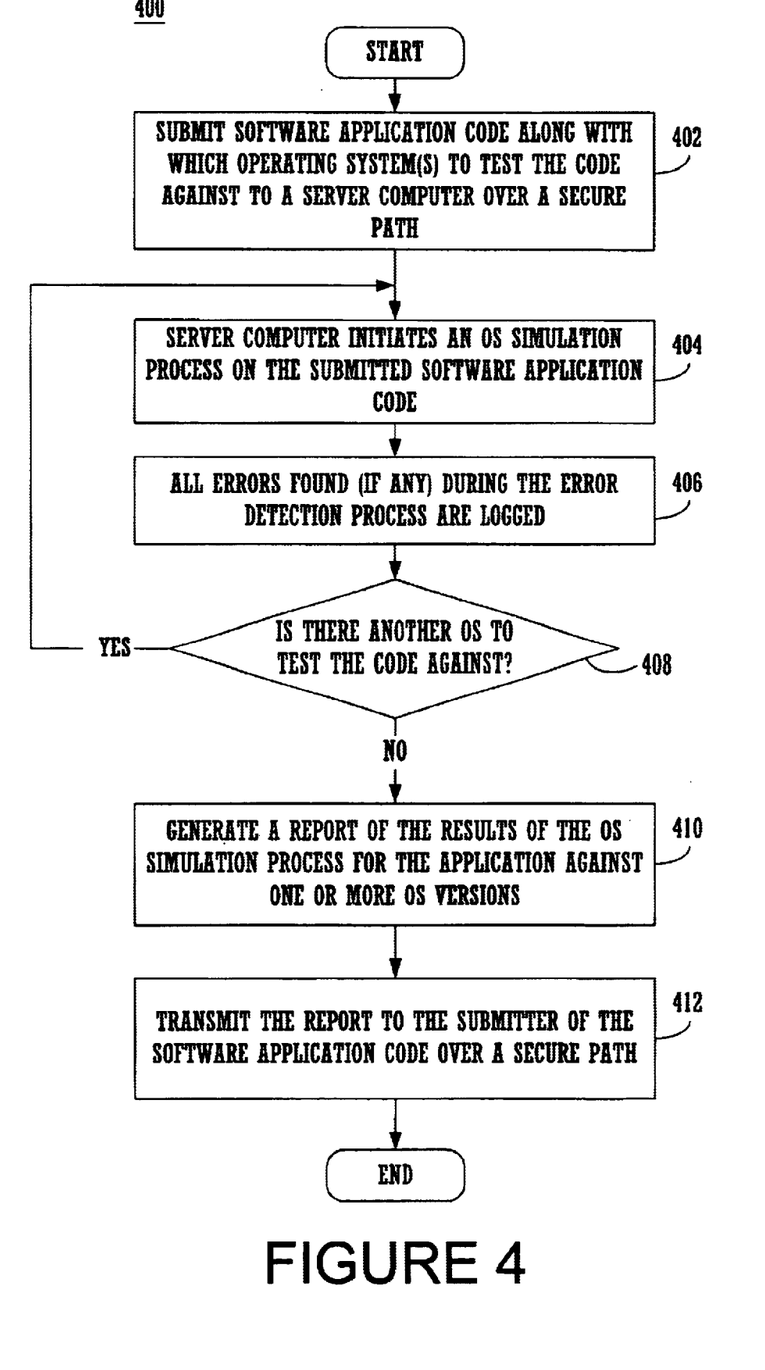
FIG. 4 is a flowchart of steps performed in accordance with another embodiment of the present invention for on-line submission and debug of software code.

FIG. 4 illustrates a flowchart 400 of steps performed in accordance with another embodiment of the present invention for on-line submission and debug of software code. Flowchart 400 includes processes of the present invention which, in one embodiment, are carried out by a processor and electrical components under the control of computer readable and computer executable instructions. Some or all of the computer readable and computer executable instructions may reside, for example, in data storage features such as computer usable volatile memory unit 104 and/or computer usable non-volatile memory unit 106 of FIG. 1. However, the computer readable and computer executable instructions may reside in any type of computer readable medium. Although specific steps are disclosed in flowchart 400, such steps are exemplary. That is, the present invention is well suited to performing various other steps or variations of the steps recited in FIG. 4. Within the present embodiment, it should be appreciated that the steps of flowchart 400 can be performed by software or hardware or any combination of software and hardware.

At step 402, in the present embodiment, computer 100 (FIG. 2) submits software application code to server computer 208 over a secure communication path via the Internet 206 (or any other type of communication medium) along with directions indicating which operating system(s) to test the code against. It is appreciated that any computer (e.g., 202 and 204) of system 200 is able to perform step 402 in accordance with the present embodiment. Furthermore, the secure path of the present embodiment is well suited to be established in a variety of ways. For example, the secure path may be established by computer 100 and server computer 208 utilizing any type of encryption technique. Additionally, it should be understood that there are many different ways in accordance with the present embodiment that computer 100 can perform step 402.

Figure 5:
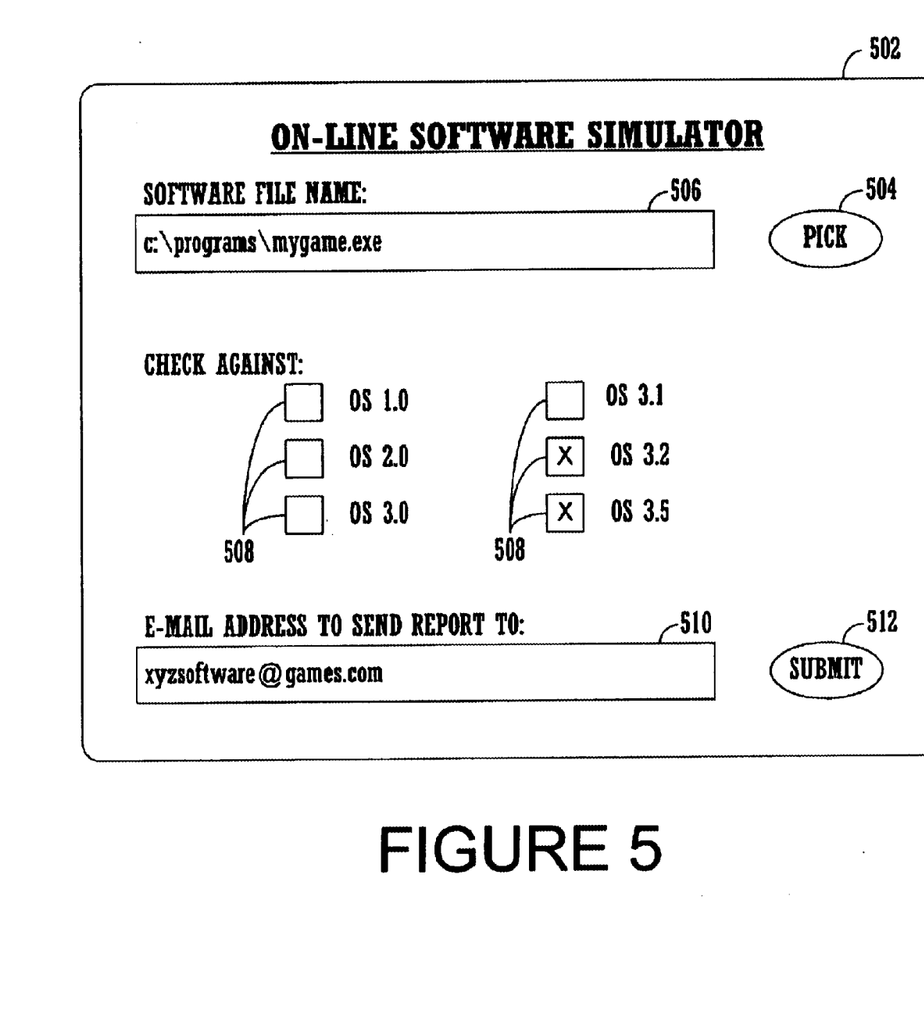
FIG. 5 illustrates an exemplary web page for submitting software application code for simulation in accordance with one embodiment of the present invention.

For instance, FIG. 5 illustrates one embodiment of a web page 502 in accordance with the present invention which may be utilized by a user (e.g., software developer, software consumer, etc.) of computer 100 to submit software application code along with directions indicating which operating system(s) to test the code against. Specifically, the user of computer 100 may click a "Pick" button 504 which inserts in window 506 the file name (e.g., C:\programs\mygame.exe) of the software application code that is desired to be tested. However, it is appreciated that the user of computer 100 may also manually enter in window 506 the file name of the software application code that is desired to be tested. Next, the user of computer 100 may check any or all of boxes 508, thereby indicating which operating system (OS) the application code is to be tested against. Additionally, the user of computer 100 may enter an e-mail address (e.g., xyzsoftware@games.com) where the results of the simulation process should be subsequently sent. Upon completion of web page 502, the user of computer 100 can click on a "Submit" button 512 which causes the submission of the software application code to server computer 208 over a secure communication path via the Internet 206 (or any other type of communication medium) along with directions-indicating which operating system(s) to test the code against.

In step 404 of FIG. 4, upon receiving the software application code, server computer 208 automatically acknowledges receipt of the code to computer 100 via the secure communication path and then automatically initiates a simulation process for the received software application code. Within another embodiment of step 404, server computer 208 automatically acknowledges receipt of the code to computer 100 via the secure path and then transmits the software application code to another server computer (e.g., 210–214) which automatically initiates a simulation process. In this manner, server computer 208 can direct the received software application code to an "idle" server computer that is not currently performing a, simulation process.

Within the present embodiment of step 404, the simulation process simulates the operation of the received software application code on a desired operating system of an electronic device (e.g., portable computing device) in order to rate the performance (e.g., degree of compatibility) of the code and/or detect any errors (e.g., incompatibilities) contained within the code. It is understood that-the present embodiment is well suited to utilize a wide variety of different types of simulation processes and/or error detection processes on the submitted software application code.

For example, one type of simulation process may simulate any particular number (e.g., 5 million) of user interactions and/or operating system interactions with the software application code in order to determine if the code includes any errors. Additionally, this type of simulation process may also keep track of the amount of simulated interactions that occurred before an error was detected within the software application code. Another type of simulation process may determine if a set of predefined programming rules were followed by the submitted software application code. For instance, the simulation process may determine if the software application code accessed or used certain data spaces, data structures, and/or parts of memory that are not reserved for software application programs.

At step 406 of FIG. 4, within the present embodiment, if any errors (e.g., incompatibilities) are found during the error detection process described above, they are automatically logged and/or recorded within a memory device. It is appreciated that the present embodiment is well suited to log and/or record a wide variety of information associated with the errors that are detected within the software application code. For example, at step 406, the present embodiment may log the line number and/or the section of the software application code that contains the error(s). Additionally, the present embodiment may also log the reason(s) why that line and/or section of software application code failed. It is understood that the present embodiment is not limited to the information that it may log corresponding to the detection of any errors within the software application code.

In another embodiment of step 406, during the simulation process described above, any determined rating results (e.g., performance information) associated with the software application code are automatically logged and/or recorded in a memory device. Therefore, if the software application code is tested against different versions and/or types of operating systems, this embodiment is able to keep track of the determined rating results of the code corresponding to each version and/or type of operating system. It is understood that this embodiment is well suited to log and/or record a wide variety of information associated with the determined rating results of the submitted software application code.

In step 408, once the simulation process of the software application code against a desired operating system is complete, the present embodiment determines whether the code is to be tested against another operating system. It is appreciated that the next operating system may be another version or type of operating system. If the code is to be tested against another operating system, the present embodiment proceeds to the beginning of step 404. In this manner, the software application code is tested against each operating system specifically requested at step 402. Furthermore, as the software application code is tested against different versions and/or types of operating systems, the present embodiment is able to keep track of the performance ratings of the code and/or the detected errors contained within the code corresponding to each tested version and/or type operating system. However, if the code is not to be tested against another operating system at step 408, the present embodiment proceeds to step 410.

At step 410 of FIG. 4, once the simulation process is complete, the present embodiment automatically generates a report corresponding to the results of the simulation process. That is, the present embodiment automatically generates a report corresponding to the performance of the submitted software application code with respect to each tested version and/or type of operating system. It is understood that the simulation report generated at step 410 may include some or all of the information logged at step 406 corresponding to the performance (e.g., degree of compatibility) of the software application code and/or the detection of any errors within the software application code. It should also be appreciated that the simulation report generated at step 410 may include a ratings system that rates how well the software application code performed with each tested version and/or type of operating system. It should be understood that there are many different ways in accordance with the present embodiment to automatically generate a report at step 410 corresponding to results of the simulation process.

Figure 6:
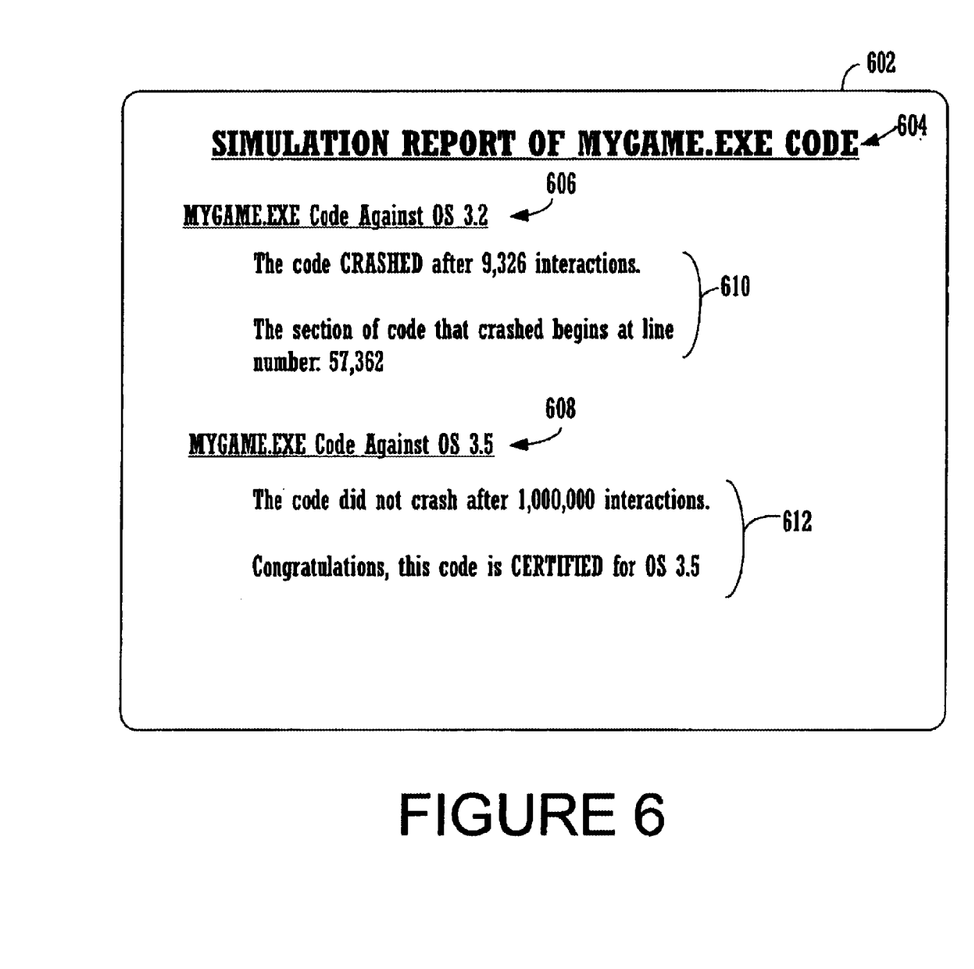
FIG. 6 illustrates an exemplary simulation report in accordance with one embodiment of the present invention.

For instance, FIG. 6 illustrates one embodiment of a simulation report 602 in accordance with the present invention which may be generated at step 410. Specifically, simulation report 602 includes a header 604 identifying the specific software application code (e.g., mygame.exe) that the simulation report corresponds to. Additionally, simulation report 602 includes subheadings 606 and 608 which each identify the particular operating system that the submitted software application code was tested against. Furthermore, located below subheading 606 is a description 610 specifically describing how the submitted software application code performed with respect to operating system (OS) 3.2. Moreover, located below subheading 608 is a description 612 specifically describing how the submitted software application code performed with respect to operating system (OS) 3.5. It is important to point out that description 612 includes a specific performance rating stating that the submitted software application code is certified for operating system 3.5. As such, a software consumer reading this performance rating (e.g., degree of compatibility) knows that the submitted software application will properly operate with operating system 3.5. It is understood that simulation report 602 is an exemplary simulation report that can be automatically generate by the present embodiment at step 410.

At step 412 of FIG. 4, the simulation report (e.g., 602) is transmitted by server computer 208 to computer 100 over a secure communication path via the Internet 206 (or any other type of communication medium). In this manner, the user (e.g., software consumer, software developer, etc.) of computer 100 is apprised remotely as to the compatibility and/or performance of the software application with particular versions and/or types of operating systems of an electronic device (e.g., portable hand-held computing device).

In other embodiments of flowchart 400, it is understood that manual initiations may be substituted for any or all of the automatic initiations described above.

Accordingly, embodiments of the present invention provide a method and system which enables a person (e.g., software developer, software consumer, etc.) to conveniently determine whether the code of a specific software application is compatible with a particular version and/or type of operating system of an electronic device (e.g., portable computing device).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for remotely determining whether software application code is compatible with an operating system version of a computing device, said method comprising the-steps-of:

receiving software application code from a remote device via a communication medium;

determining if said software application code is compatible with an operating system of a computing device;

in response to finding an incompatibility within said software application code, logging said incompatibility;

generating a report; and transmitting said report to said remote device via said communication medium.

2. The method as described in claim 1 wherein said report includes said incompatibility.

3. The method as described in claim 1 wherein said remote device comprises a computer system.

4. The method as described in claim 1 wherein said communication medium is the Internet, wireless communication, or wired communication.

5. The method as described in claim 1 wherein said logging comprises logging a line number of said software application code.

6. The method as described in claim 1 wherein said logging comprises logging a section of said software application code.

7. The method as described in claim 1 further comprising transmitting a signal to said remote device via said communication medium acknowledging receipt of said software application code.

8. The method as described in claim 1 wherein said software application code is received via a secure communication path.

9. The method as described in claim 1 wherein said computing device comprises a portable computing device.

10. A computer readable medium having computer readable code embodied therein for causing a computer to perform a method comprising:

receiving software application code from a remote computer via a communication medium;

determining if said software application code is compatible with an operating system of a portable computing device;

in response to finding an incompatibility within said software application code, logging said incompatibility;

generating a report; and transmitting said report to said remote computer via said communication medium.

11. The computer readable medium as described in claim 10 wherein said communication medium is the Internet, a wireless communication medium, or a wired communication medium.

12. The computer readable medium as described in claim 10 wherein said logging comprises logging a line number of said software application code.

13. The computer readable medium as described in claim 10 wherein said logging comprises logging a section of said software application code.

14. The computer readable medium as described in claim 10 wherein said method further comprising:

transmitting a signal to said remote device via said communication medium acknowledging receipt of said software application code.

15. The computer readable medium as described in claim 10 wherein said software application code is received via a secure communication path.

16. A system for remotely determining whether software application code is compatible with an operating system of a computing device, said system comprising:

a remote computing device; and a computer coupled to receive software application code from said remote computing device, said computer performs a method comprising:

determine if said software application code is compatible with an operating system of a computing device;

in response to finding an incompatibility within said software application code, logging said incompatibility;

generating a report; and transmitting said report to said remote computing device.

17. The system as described in claim 16 wherein said computer is coupled to said remote computing device by the Internet.

18. The system as described in claim 16 wherein said computer is coupled to said remote computing device by wireless communication or wired communication.

19. The system as described in claim 16 wherein said remote computing device submits said software application code to said computer utilizing a web page.

20. The system as described in claim 16 wherein said report includes said incompatibility.

21. The system as described in claim 16 wherein said software application code is received by said computer via a secure communication path.

22. A computer readable medium having computer readable code embodied therein for causing a computer to perform a method comprising:

(a) receiving software application code from a remote computer via a communication medium;

(b) determining if said software application code is compatible with a first operating system of a computing device;

(c) in response to finding an incompatibility within said software application code, logging said incompatibility;

(d) repeating (b) and (c) for a second operating system;

(e) generating a report; and (f) transmitting said report to said remote computer via said communication medium.

23. The computer readable medium as described in claim 22 wherein said logging comprises logging a line number of said software application code.

24. The computer readable medium as described in claim 22 wherein said report comprises said incompatibility.

25. The computer readable medium as described in claim 22 wherein said logging comprises logging a section of said software application code.

26. The computer readable medium as described in claim 22 wherein said determining comprises a simulation process for said software application code.

* * * * *

UNITED STATES PATENT AND TRADEMARK OFFICE
CERTIFICATE OF CORRECTION

PATENT NO. : 6,775,823 B2
DATED : August 10, 2004
INVENTOR(S) : Kevin MacDonell

It is certified that error appears in the above-identified patent and that said Letters Patent is hereby corrected as shown below:

<u>Title page,</u>
Item [22] Filed, should read:
-- [22] Filed: Nov. 30, 2000 --

Signed and Sealed this

Fifth Day of April, 2005

JON W. DUDAS
*Director of the United States Patent and Trademark Office*